United States Patent
Wu

(10) Patent No.: US 9,170,867 B2
(45) Date of Patent: Oct. 27, 2015

(54) SERVER SYSTEM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Kang Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 238 days.

(21) Appl. No.: 14/010,551

(22) Filed: Aug. 27, 2013

(65) Prior Publication Data

US 2014/0115399 A1    Apr. 24, 2014

(30) Foreign Application Priority Data

Oct. 24, 2012    (CN) .......................... 2012 1 04090718

(51) Int. Cl.
*G06F 11/00* (2006.01)
*G06F 11/32* (2006.01)
*G06F 11/20* (2006.01)
*G06F 11/30* (2006.01)

(52) U.S. Cl.
CPC .......... *G06F 11/006* (2013.01); *G06F 11/3055* (2013.01); *G06F 11/327* (2013.01); *G06F 11/20* (2013.01); *G06F 11/3031* (2013.01)

(58) Field of Classification Search
CPC ..................................................... G06F 11/3031
USPC ............. 714/22, 21, 25, 29, 30–35, 2, 4.1, 14
See application file for complete search history.

(56) References Cited

U.S. PATENT DOCUMENTS

| | | | |
|---|---|---|---|
| 6,532,500 B1* | 3/2003 | Li et al. ........................... | 710/15 |
| 7,627,774 B2* | 12/2009 | Egan et al. ..................... | 714/4.4 |
| 2003/0140291 A1* | 7/2003 | Brown et al. .................. | 714/724 |
| 2007/0170783 A1* | 7/2007 | Loffink et al. .................. | 307/64 |
| 2007/0208981 A1* | 9/2007 | Restrepo et al. ............... | 714/731 |

* cited by examiner

*Primary Examiner* — Dieu-Minh Le

(74) *Attorney, Agent, or Firm* — Novak Druce Connolly Bove + Quigg LLP

(57) ABSTRACT

An exemplary system server includes a first server, a second server, and a bridge board. The bridge board includes a printed circuit board and a power input positioned on the printed circuit board. The power input receives power from a power source. The first server includes a first controller and a first ground end connected to ground. The first controller includes a first detecting end connected to the power input. The second server includes a second controller and a second ground end. The second ground end connects the first detecting end to ground via the bridge board. The first controller determines whether the second server functions according to a voltage of the first detecting end.

18 Claims, 1 Drawing Sheet

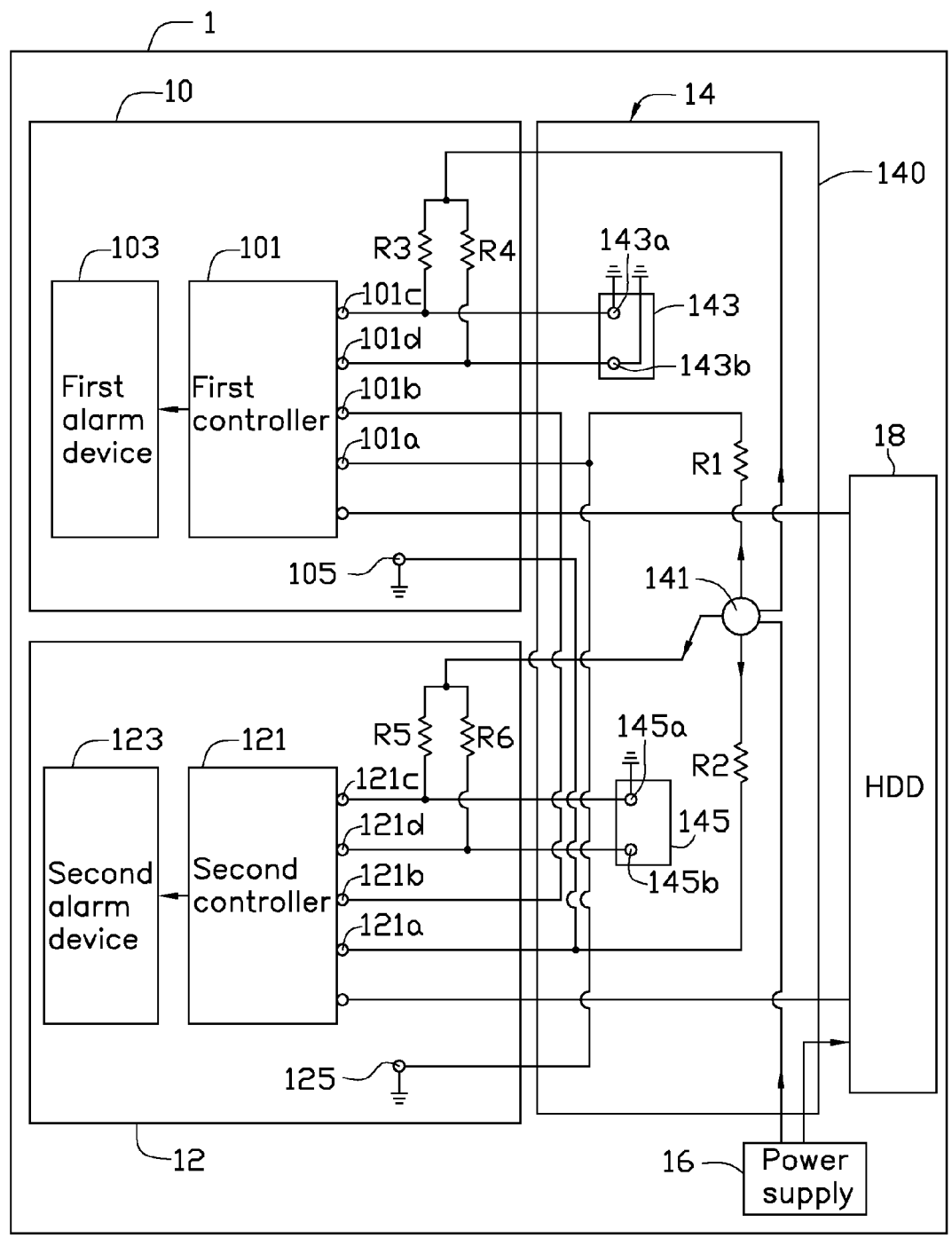

SERVER SYSTEM

BACKGROUND

1. Technical Field

The present disclosure relates to a server system.

2. Description of Related Art

A server system usually includes a plurality of servers and a plurality of hard disks. The servers operate independently from each other except for sharing a power supply. If a server among the servers fails to function, other servers cannot receive this information. Accordingly, operators may not be able to repair the server that fails to function in time.

Therefore, it is desirable to provide a means which can overcome the above-mentioned problems.

BRIEF DESCRIPTION OF THE DRAWINGS

The FIGURE is a schematic structural diagram illustrating one embodiment of a server system according to the present disclosure.

DETAILED DESCRIPTION

Reference will be made to the drawing to describe specific exemplary embodiments of the present disclosure.

The FIGURE is a schematic structural diagram illustrating one embodiment of a server system 1 according to the present disclosure. The server system 1 includes at least two servers, a bridge board 14, a power source 16, and a hard disk (HDD) 18. In the present embodiment, the at least two servers includes a first server 10 and a second server 12. In alternative embodiments, the number of the at least two servers may be three, four, or more, for example. The first server 10 and the second server 12 are connected to the hard disk 18 via the bridge board 14. The power supply 16 supplies power to the hard disk 18.

The bridge board 14 includes a printed circuit board 140, a power input 141, a first pull-up resistor R1, a first identification unit 143, a second pull-up resistor R2, and a second identification unit 145. The power input 141, the first pull-up resistor R1, the first identification unit 143, the second pull-up resistor R2, and the second identification unit 145 are positioned on the printed circuit board 140. The power input 141 is connected to the power supply 16, and receives the power from the power supply 16. The first identification unit 143 is connected to the first server 10 and provides a first identification code. The second identification unit 145 is connected to the second server 12 and provides a second identification code different from the first identification code. The first identification code and the second identification code are configured to identify the first server 10 and the second server 12.

The first identification unit 143 includes a first end 143a and a second end 143b. The second identification unit 145 includes a third end 145a and a fourth end 145b. In the present embodiment, the first end 143a and the second end 143b are both connected to ground. Accordingly, voltages of the first end 143a and the second end 143b are both 0V (volt). The third end 145a is connected to ground. The fourth end 145 is floated on the bridge board 14, and is connected to the power input 141 via a sixth pull-up resistor R6 of the second server 12 when the second server 12 functions. Accordingly, a voltage of the third end 145a is 0V, and a voltage of the fourth end 145b is higher than 0V, such as 2V, when the second server 12 functions.

In the present embodiment, the first identification code is "00". The first binary number "0" of the first identification code "00" represents that the voltage applied on the first end 143a is 0V, and the second binary number "0" of the first identification code "00" represents that the voltage applied on the second end 143b is 0V. The second identification code is "01". The first binary number "0" of the second identification code is "01" represents that the voltage applied on the third end 145a is 0V. The second binary number "1" represents that the voltage applied on the fourth end 145b is more than 0V.

However, the first identification code and the second identification code are not limited to "00" and "01". The first second identification code may be "10", "11", and "01", and the second identification code may correspondingly be "00", "10", and "11", for example, as long as the first identification code differs from the second identification code. Accordingly, the first server 10 and the second server 12 can be distinguished. In addition, the number of ends of the first identification unit 143 or/and the second identification unit 145 is not limited to 2. The number of the ends of the first identification unit 143 or/and the second identification unit 145 can be expanded based on the number of the at least two servers.

The first server 10 includes a first controller 101, a first alarm device 103, a first ground end 105, a third pull-up resistor R3 and a fourth pull-up resistor R4. The first alarm device 103 is connected to the first controller 101. The first controller 101 includes a first detecting end 101a, a first transferring end 101b, a first connecting end 101c, and a second connecting end 101d. The first connecting end 101c is connected to the power input 141 via the third pull-up resistor R3, and is further connected to the first end 143a. The second connecting end 101d is connected to the power input 141 via the fourth pull-up resistor R4, and is further connected to the second end 143b. The first detecting end 101a is connected to the power input 141 via the first pull-up resistor R1, and is further connected to the second server 12 via the bridge board 14. The first transferring end 101b is connected to the second server 12 via the bridge board 14.

The second server 12 includes a second controller 121, a second alarm device 123, a second ground end 125, a fifth pull-up resistor R5 and the sixth pull-up resistor R6. The second alarm device 123 is connected to the second controller 121. The second controller 121 includes a second detecting end 121a, a second transferring end 121b, a third connecting end 121c, and a fourth connecting end 121d. The third connecting end 121c is connected to the power input 141 via the fifth pull-up resistor R5, and is further connected to the third end 145a. The fourth connecting end 121d is connected to the power input 141 via the sixth pull-up resistor R6, and is further connected to the fourth end 145b. The second detecting end 121a is connected to the power input 141 via the second pull-up resistor R2, and is further connected to the first ground end 105 of the first server 10 via the bridge board 14. The second transferring end 121b is connected to the first transferring end 101b of the first server 10 via the bridge board 14. The second ground end 125 is connected to the first detecting end 101a of the first server 10 via the bridge board 14.

The first alarm device 103 and the second alarm device 123 each may be a buzzer or a pilot lamp, for example.

According to the first identification code and the second identification code, the first controller 101 and the second controller 121 automatically select one of the first controller 101 and the second controller 121 to act as a main controller. The main controller manages information of other controllers. For more servers, when one of the at least two servers having the main controller fails to function, other servers select another controller instead of a previous main controller to act as a current main controller.

A number of software programs are stored in the first controller 101 and the second controller 121, or appropriate hardware components are integrated into the first controller 101 and the second controller 121, or firmware may be installed in the first controller 101 and the second controller 121, such that the first controller 101 and the second controller 121 automatically select one of the first controller 101 and the second controller 121 to act as the main controller according to the first identification code and the second identification code.

An operation of the server system 1 is as follows.

When the first server 10 and the second server 12 are electrically connected to the bridge board 14 and operate normally, the first detecting end 101a is electrically connected to the second ground end 125 via the bridge board 14. Accordingly, a voltage applied on the first detecting end 101a is 0V. The first connecting end 101c is electrically connected to the first end 143a, and the second connecting end 101d is electrically connected to the second end 143b. Accordingly, voltages applied on the first connecting end 101c and the second connecting end 101d both are 0V. The first identification code of the first identification unit 143 is "00".

At the same time, the second detecting end 121a is electrically connected to the first ground end 105 via the bridge board 14. Accordingly, a voltage applied on the second detecting end 121a is 0V (Volt). The third connecting end 121c is electrically connected to the third end 145a. Accordingly, a voltage applied on the third connecting end 121c is 0V. The fourth connecting end 121d is electrically connected to the floated fourth end 145b, and is further connected to the power input 141 via the sixth pull-up resistor R6. Accordingly, a voltage applied on the fourth connecting end 121 is more than 0V. Correspondingly, the second identification code of the second identification unit 145 is "01".

In the present embodiment, the first controller 101 acts as a default main controller according to the first identification code. The first controller 101 receives the first information from the second controller 121 via the second transferring end 121b and the first transferring end 101b, and outputs the second information to the second controller 121 via the first transferring end 101b and the second transferring end 121b.

When the second server 12 fails to function, the second server 12 is not electrically connected to the bridge board 14. The first detecting end 101a of the first server 10 is disconnected from the second ground end 125 of the second server 12. A voltage of the first detecting end 101a is pulled up to a high voltage (such as, 5V) from 0V due to the first pull-up resistor R1. The first server 10 determines that the second server 12 fails to function according to the voltage of the first detecting end 101a and sends a first control signal to the first alarm device 103. The first alarm device 103 outputs alarm information representing that the second server 12 fails to function according to the first control signal, such that the operator learns that the second server 12 fails to function and repairs the second server 12 in time.

In addition, when the first server 10 fails to function, the second detecting end 121a of the second server 12 is disconnected from the first ground end 105 of the first server 10. A voltage of the second detecting end 121a is pulled up to a high voltage (such as, 5V) from 0V due to the second pull-up resistor R2. The second server 12 determines that the first server 10 fails to function according to the voltage of the second detecting end 121a and sends a second control signal to the second alarm device 123. The second alarm device 123 outputs alarm information representing that the first server 10 fails to function, such that the operator learns that the first server 10 fails to function and can repair the first server 10 in time. Further, the second controller 121 is selected to act as a current main controller instead of the first controller 101, to manage information of other controllers if the server system 1 further includes other servers (not shown).

Since the server system 1 includes a first server 10 including the first detecting end 101a, the first detecting end 101a is electrically connected to the power input 141 on the bridge board 14, and is further electrically connected to the second ground end 125 of the second server 12, the first controller 101 determines whether the second server 12 functions according to the voltage on the first detecting end 101a. Accordingly, the operator repairs the second server 12 in time when the first controller 101 determines that the second server 12 fails to function.

Similarly, the second controller 121 determines whether the first server 10 functions according to the voltage on the second detecting end 121a. Accordingly, the operator repairs the first server 10 in time when the second controller 121 determines that the first server 10 12 fails to function.

In alternative embodiments, when the number of the at least two servers of the server system 1 exceeds two, connections between every two servers via the bridge board 14 are identical to a connection between the first server 10 and the second server 20 via the bridge board 14.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A server system, comprising:
    a bridge board comprising a printed circuit board and a power input positioned on the printed circuit board, the power input receiving power from a power source;
    a first server comprising a first controller and a first ground end connected to ground, the first controller comprising a first detecting end connected to the power input;
    a second server comprising a second controller and a second ground end, the second ground end connecting the first detecting end to ground via the bridge board;
    wherein the first controller determines whether the second server functions according to a voltage of the first detecting end.

2. The server system according to claim 1, wherein when the first detecting end is electrically connected to the power input, and receives a ground signal from the second ground end of the second server via the bridge board, the first controller determines that the second server functions.

3. The server system according to claim 2, wherein when the first detecting end is electrically connected to the power input, and does not receive the ground signal from the second ground end of the second server via the bridge board, the first controller determines that the second server fails to function.

4. The server system according to claim 3, wherein the bridge board further comprises a first pull-up resistor positioned on the printed circuit board, and the first detecting end is connected to the power input via the first pull-up resistor.

5. The server system according to claim 3, wherein the first server further a first alarm device, when the second server fails to function, the first controller sends a first control signal to the first alarm device, and the first alarm device outputs a first alarm information representing that the second server fails to function according to the first control signal.

6. The server system according to claim 1, wherein the second controller comprises a second detecting end, the second detecting end is connected to the power input, and is further connected to the first ground end of the first server via the bridge board, the second controller determines whether the first server functions or not according to a voltage of the second detecting end.

7. The server system according to claim 6, wherein when the second detecting end is electrically connected to the power input, and receives a ground signal from the first ground end of the first server via the bridge board, the second controller determines that the first server functions.

8. The server system according to claim 7, wherein when the second detecting end is electrically connected to the power input, and does not receive the ground signal from the first ground end of the first server via the bridge board, the second controller determines that the first server fails to function.

9. The server system according to claim 8, wherein the bridge board further comprises a second pull-up resistor positioned on the printed circuit board, the second detecting end is connected to the power input via the second pull-up resistor.

10. The server system according to claim 8, wherein the first server further a second alarm device, when the first server fails to function, the second controller sends a second control signal to the second alarm device, and the second alarm device outputs a second alarm information representing that the first server fails to function according to the second control signal.

11. The server system according to claim 6, wherein the bridge board further comprises a first identification unit positioned on the printed circuit board and a second identification unit positioned on the printed circuit board, the first identification unit is connected to the first controller and provides a first identification code, the second identification unit is connected to the second controller and provides a second identification code different from the first identification code, the first identification code and the second identification code are configured to identify the first controller and the second controller.

12. The server system according to claim 11, wherein when the first controller is connected to the first identification unit, the first controller acts as a main controller according to the first identification code, the first controller manages information of the second controller.

13. The server system according to claim 12, wherein the first controller further comprises a first transferring end, the second controller further comprises a second transferring end connected to the first transferring end, the first controller receives the first information from the second controller via the second transferring end and the first transferring end, and outputs the second information to the second controller via the first transferring end and the second transferring end.

14. The server system according to claim 13, wherein when the first server fails to function, the second controller acts as a main controller instead of the first controller according to the second identification code.

15. The server system according to claim 11, wherein the first identification unit comprises a first end and a second end; the first controller further comprises a first connecting end connected to the first end and a second connecting end connected to the second end; the second identification unit comprises a third end and a fourth end; the second controller further comprises a third connecting end connected to the third end and a fourth connecting end connected the fourth end; the first identification code comprises two binary numbers, the first binary number of the first identification code represents a voltage applied to the first end, and the second binary number of the first identification code represents a voltage applied to the second end; the second identification code comprises two binary numbers, the first binary number of the second identification code represents a voltage applied to the third end, and the second binary number of the second identification code represents a voltage applied to the fourth end.

16. The server system according to claim 15, wherein the first server further comprises a third pull-up resistor and a fourth pull-up resistor, the first connecting end is connected to the power input via the third pull-up resistor, and the second connecting end is connected to the power input via the fourth pull-up resistor.

17. The server system according to claim 16, wherein the second server further comprises a fifth pull-up resistor and a sixth pull-up resistor, the third connecting end is connected to the power input via the fifth pull-up resistor, and the fourth connecting end is connected to the power input via the sixth pull-up resistor.

18. The server system according to claim 11, further comprising a hard disk, wherein the first server and the second server are connected to the hard disk via the bridge board.

\* \* \* \* \*